United States Patent

[11] 3,583,751

[72] Inventor Erving F. White
Jackson, Mich.
[21] Appl. No. 800,617
[22] Filed Mar. 21, 1969
[45] Patented June 8, 1971
[73] Assignee Aeroquip Corporation
Jackson, Mich.

[54] GRAB LINK
2 Claims, 3 Drawing Figs.
[52] U.S. Cl. .................................................... 294/74,
294/78, 294/82
[51] Int. Cl. ........................................................ B66c 1/12

[50] Field of Search........................................... 294/83, 75,
74; 24/116, 241 CH, 230 CF, 230 SC

[56] References Cited
UNITED STATES PATENTS
3,074,136  1/1963  Looker.......................... 294/83 X

*Primary Examiner*—Evon C. Blunk
*Assistant Examiner*—Douglas D. Watts
*Attorney*—Jerry K. Harness ABSTRACT: A grab link for chain attached to a webbing strap. The grab link has two symmetrical frame pieces connected at both ends by bolts, one bolt being used for attaching the webbing and the other for the end chain link. The captive link is separated from the end chain link by a member bridging the frame pieces, and a keeper is pivoted on the frame.

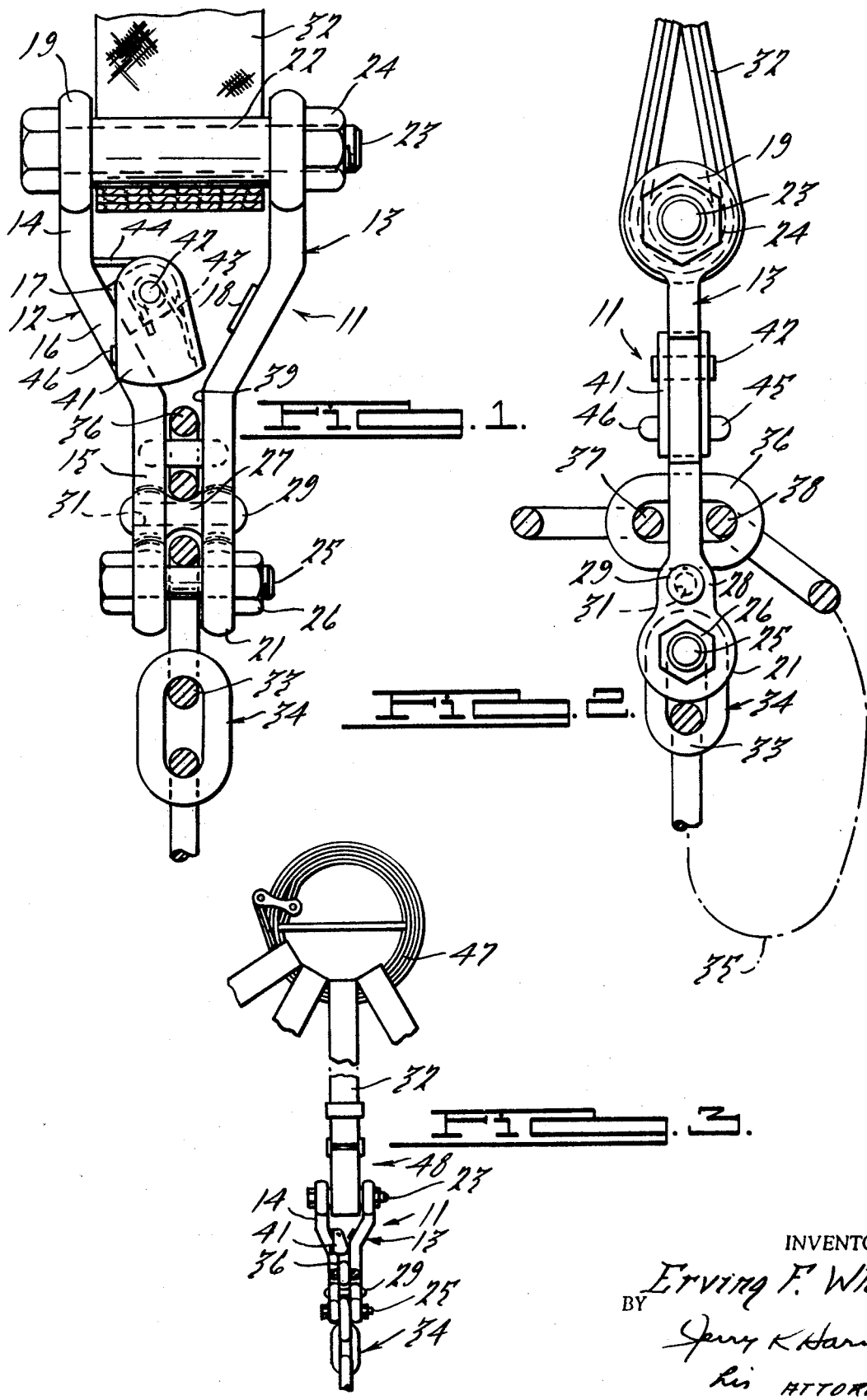

GRAB LINK

BACKGROUND OF THE INVENTION

1. Field of the Invention

The invention relates to grab links usable in such applications as helicopter cargo sling assemblies. A typical assembly is shown in Elsner U.S. Pat. No. 3,116,948 in which a webbing ring has sling legs extending from it, the sling legs being fabricated of webbing. The grab links are secured to the outer ends of these legs and have chains secured to their outer ends. The chains may be looped around a load and adjusted as to length by slipping a link of the chain into the grab link where it will be secured.

2. Description of the Prior Art

The following United States patents show typical grab links or grab hooks known in the prior art: Deong et al., No. 1,507,651; Abbe, No. 1,709,244; and Butterworth, No. 1,889,633. These prior art devices, however, do not incorporate the features of the present invention, described below, which result in an economically constructed but durable grab link capable of withstanding great forces without undue stress concentrations or distorting effects which could weaken the chain or its associated parts.

SUMMARY OF THE INVENTION

According to the invention, the grab link is constructed of two frame pieces which are identical except for the fact that one piece has an ear for supporting a pivoted keeper whereas on the other piece the ear is cut away. The frame pieces face each other so as to be symmetrical about the centerline of the grab link axis, and are so shaped as to provide a wide portion at one end of the grab link and a narrow portion at the other end. Bolts extend across the two ends of the grab link to connect the frame pieces, the bolt at the wide end having a spacer which permits a webbing strap to be attached to the grab link. The chain is connected to the other end of the grab link by a bolt which passes through a link at one end of the chain. A spacer bridges the grab link frame pieces adjacent this bolt and a rivet passes through this spacer. The spacer separates the link being grabbed (the captive link) from the end link. Thus the links will not press against each other with the subsequent danger of being deformed and thereby weakened.

A keeper is pivotally mounted on the ear carried by one of the frame pieces and prevents the captive link from inadvertently coming out of the grab link. This keeper is of U-shaped cross section and embraces the frame piece on which it is mounted, so that it will not be accidentally twisted by lateral forces.

Since the chain is attached to the grab link, it may be used either to form an adjustable bight or loop surrounding a load, or to carry a hook at its outer end. Because of this novel arrangement, and the fact that removable bolts are provided at the ends of the grab link, it is unnecessary to provide a shackle to attach or detach either the webbing strap or the chain. Since the use of the shackle is optional, the problem of orienting the hook at the end of the chain with respect to the grab link, so as to avoid twisting when picking up certain types of loads is avoided. When the grab link is used to form an adjustable type of bight, only half the load will have any component tending to spread the grab link frame, thereby greatly lessening the danger of failure.

BRIEF DESCRIPTION OF THE DRAWINGS

FIG. 1 is a side elevational view of the grab link showing a portion of a chain attached thereto with another portion of the chain being held captive by the grab link;

FIG. 2 is an end elevational view of the grab link showing the chain being held thereby; and FIG. 3 is a partial view of a cargo sling assembly showing one manner in which the grab link may be used.

DESCRIPTION OF THE PREFERRED EMBODIMENT

The grab link is generally indicated at 11 and comprises two frame pieces generally indicated at 12 and 13. These two pieces are similarly formed, each having two straight sections 14 and 15 connected by an inclined section 16. The inclined section on one frame piece 14 has an ear 17 extending therefrom, whereas this ear is cut away from the other frame piece, leaving a stub 18. The frame pieces may be forged or otherwise fabricated in a manner providing the necessary strength.

An eye 19 is formed at the outer end of leg 14 of each frame piece and an eye 21 is formed at the outer end of leg 15 thereof. A spacer 22 is disposed between eyes 19 and a bolt 23 passes therethrough and is secured by nut 24. Another bolt 25 passes through eyes 21 and is secured by a nut 26. A member 27 preferably in the form of a tubular spacer bridges enlarged intermediate portions 28 of legs 15, and a rivet 29 passes through apertures 31 in portions 28 and through member 27, which has a concave surface. The member 27 could be formed in two pieces each as an integral part of one of legs 15. In this manner the two pieces would abut each other to form the bridge. If necessary the two pieces could be drilled to receive securing means. The length of bolts 23 and 25 and rivet 29 are such that legs 14 and 15 will be parallel, legs 14 forming a wider portion of the grab link and legs 15 a narrower portion. The distance between legs 14 is such that a webbing strap 32 may engage spacer 22. The spacing between legs 15 is such as to accommodate an end link 33 of a chain generally indicated at 34 which is to be used for engaging cargo or other loads. The other end of chain 34 (not shown) may have a hook or similar load-engaging device, or the chain may be used to form a bight or loop indicated at 35 in FIG. 2.

The distance from member 27 to the beginning of inclined portions 16 is such that a link 36 of chain 34 may be received thereby as shown in FIGS. 1 and 2, this link having links 37 and 38 on either side of it which will engage frame pieces 12 and 13, so that the size of loop 35 will be determined by which link 36 is selected to enter the slot 39 formed by legs 15 above member 27. The latter is spaced a sufficient distance from bolt 25 to permit end link 33 to be mounted on the bolt. However, the pressure of captive link 36 on member 27 will not be transmitted to link 33, which will always be held in spaced relation therefrom. Therefore, any forces will be avoided on links 33 and 36 which might tend to distort and weaken one or both of them. Furthermore, link 33 will not exert any lateral stresses on the frame pieces, whatever slight lateral forces which are present being exerted by link 36 which is only slightly narrower than space 39.

Ear 17 supports a keeper 41 which is pivotally mounted at 42 on tab 17. Keeper 41 has a U-shaped cross section with the sides thereof embracing inclined portion 16 of frame piece 12. The keeper extends downwardly to block the upper end of slot 39, and is urged toward a detent position by a spring 43, this position being defined by a projection 44 on keeper 41. However, keeper 41 may be swung clockwise from its FIG. 1 position to a releasing position permitting withdrawal of chain link 36. It should be noted that the close proximity of keeper 41 to frame pieces 12 and 13 will serve to protect the keeper against lateral forces which might otherwise distort or break it. Ears 45 and 46 are provided on keeper 41 to facilitate its movement to releasing position.

One possible use for grab link 11 is shown in FIG. 3. This figure shows a ring 47 made of webbing which supports a cargo or other load by means of a plurality of sling legs generally indicated at 48. The upper ends of these legs are attached to ring 47, and the legs comprise three main parts, webbing strap 32, grab link 11 and chain 34. The upper end of strap 32 is secured to ring 47, and the strap is looped around spacer 22 and adjusted to the desired length. Chain 34 may be used in either of the two manners indicated above, namely, with a hook at its outer end or looped back to be engaged by grab link 11. In any case, it will be noted that the provision of removable bolts at both ends of the grab link will facilitate connection and disconnection of the components. The use of a shackle connecting bolt 25 with chain 34 is optional, depending on the orientation of the load with respect to the other parts.

When used as a grab link, the concave surface of member 27 will avoid undue stress concentrations on captive link 36 and will, as indicated above, prevent this link from engaging link 33. Chain 34 may be adjusted to its proper loop size merely by passing it through the space between legs 14 of the frame pieces, and when the proper loop size is achieved, slipping link 36 down past keeper 41 into slot 39.

I claim:

1. In combination with the chain having a plurality of interlocking links, a grab link comprising a pair of similarly shaped frame pieces spaced in a facing relationship, each piece having two straight sections connected by an inclined section, means connecting the ends of said frame pieces so that they form a grab link having a relatively wide spacing between the frame pieces at one end and relatively narrow spacing at the other end, the sections at the narrow end being parallel, said means connecting the lower sections passing through a link at one end of said chain, the spacing between said narrow sections being slightly larger than the thickness of said chain links, a member bridging said narrow sections, a captive link entering the slot formed by said narrow sections engaging said member thereby preventing said captive link from engaging said link at one end of said chain, and keeper means carried by one of said frame pieces and movable from a chain-link-restraining position to a chain-link-releasing position.

2. The subject matter of claim 1, wherein said bridging member has a generally concave tubular shape.